United States Patent [19]
Takei et al.

[11] Patent Number: 5,462,985
[45] Date of Patent: Oct. 31, 1995

[54] MATTE ELECTRODEPOSITABLE COATING COMPOSITION AND PROCESS FOR PREPARING THE SAME

[75] Inventors: Toshiaki Takei; Satoshi Kayamori; Hiroyuki Ota, all of Aichi, Japan

[73] Assignee: Taogosei Co., Ltd., Tokyo, Japan

[21] Appl. No.: 366,301

[22] Filed: Dec. 29, 1994

[30] Foreign Application Priority Data

Dec. 29, 1993 [JP] Japan ................... 5-350375

[51] Int. Cl.$^6$ .................................. C08K 5/00
[52] U.S. Cl. ........................ 524/204; 204/181.4
[58] Field of Search ................... 524/147, 204; 204/181.4

[56] References Cited

U.S. PATENT DOCUMENTS

| | | | |
|---|---|---|---|
| 3,632,546 | 1/1972 | Haung et al. | 260/31.2 |
| 4,058,497 | 11/1977 | Ko et al. | 524/247 |
| 4,329,269 | 5/1982 | Takashina et al. | 525/366 |

FOREIGN PATENT DOCUMENTS

| | | |
|---|---|---|
| 39369 | 2/1991 | Japan . |
| 207773 | 9/1991 | Japan . |

*Primary Examiner*—John Niebling
*Assistant Examiner*—Kishor Mayekar
*Attorney, Agent, or Firm*—Sughrue, Mion, Zinn, Macpeak & Seas

[57] ABSTRACT

A matte electrodepositable coating composition and a process for preparation thereof, the composition comprising a fluorine-containing resin, an acrylic resin, an amino resin, and an aluminum complex compound, which are dissolved or dispersed in water, the fluorine-containing resin and the acrylic resin both containing a carboxyl group and a hydroxyl group in molecules thereof, the differences in acid value and hydroxyl value between the fluorine-containing resin and the acrylic resin each being not more than 50, the average acid value of the fluorine-containing resin and the acrylic resin being not less than 35, the average hydroxyl value of the fluorine-containing resin and the acrylic resin being not less than 70, the proportion of the fluorine-containing resin and the acrylic resin being in the range of 20/80 to 80/20 by weight, and the aluminum complex compound being represented by formula (1) or (2):

$$Al(OR^1)(OR^2)(L) \quad (1)$$

$$Al(L^1)(L^2)(L^3) \quad (2)$$

wherein $R^1$ and $R^2$ each independently represents an alkyl group; and L, $L^1$, $L^2$, and $L^3$ each independently represent a keto-enol tautomeric compound.

11 Claims, No Drawings

MATTE ELECTRODEPOSITABLE COATING COMPOSITION AND PROCESS FOR PREPARING THE SAME

FIELD OF THE INVENTION

The present invention relates to a matte electrodepositable coating composition (hereinafter occasionally referred to as "coating composition") excellent in transparency and weather resistance and a process for preparing such a matte electrodepositable coating composition. The coating composition of the present invention can be used to coat aluminum sash window frame on multistory building, metallic products, metallic parts, etc.

BACKGROUND OF THE INVENTION

Among electrodeposition coating methods, matte electrodeposition coating can provide a minimized metallic luster and thus produce a reposed atmosphere. In recent years, the matte electrodeposition coating has rapidly found a wide application to the surface protection as well as the improvement of the appearance of various metallic parts. Various matte electrodeposition coating methods for acrylic resin have been proposed.

The inventors of the present invention previously found that the mixing of a premix of an aluminum complex compound (hereinafter occasionally referred to as "complex compound") and an amino resin with a solution of an acrylic resin in an organic solvent can provide a matte electrodepositable coating that can be stably applied without causing agglomeration or precipitation of particles and thickening or gelation of the coating bath prepared from the matte electrodeposition coating, as described in JP-A-3-207773. The term "JP-A" as used herein means an unexamined published Japanese patent application.

However, the weather resistance of acrylic electrodeposition coating films for use in aluminum building materials leaves much to be desired when applied to the external wall of multistory buildings requiring a high weather resistance over a prolonged period of times as several decades, though showing no problems when applied to ordinary houses.

In order to eliminate these problems, matte electrodeposition coating compositions comprising a fluorine-containing resin having a good weather resistance as a constituent of a coating film have been proposed. For example, JP-A-3-39369 discloses a coating composition comprising a base resin and a crosslinking agent as essential components, wherein the base resin is a mixture of a resin (A) and a resin (B); at least one of the resins (A) and (B) is a fluorine-containing resin; the acid value of the resins (A) and (B) are 40 to 150 and less than that of the resin (A), respectively; and the difference in acid value between the two resins being not less than 40. The coating composition can allegedly form a matte coating film with a good durability and appearance.

However, the above prior art technique, though capable of forming a matte coating film, is disadvantageous in that the use of a fluorine-containing resin and an acrylic resin which greatly differ from each other in acid value (although it is stipulated as not less than 40 in the above JP-A-3-39369, its preferable value is described as not less than 60 in its detailed description and 90 in Examples thereof) provides a poor compatibility therebetween, reducing the transparency of the coating film. In addition, a fluorine-containing resin is disadvantageous in that it has a low acid value and hydroxyl value and thus provides an electrodepositable coating which exhibits too low a throwing power to be uniformly applied to a material to be coated.

SUMMARY OF THE INVENTION

An object of the present invention is therefore to provide a matte electrodepositable coating composition having a good throwing power which can be applied to form a matte coating film with a good transparency and weather resistance even if the difference in acid value between fluorine-containing resin and acrylic resin used is small.

Another object of the present invention is to provide a process for the preparation of such a matte electrodepositable coating composition.

Other objects and effects of the present invention will be apparent from the following description.

As a result of extensive investigations by the present inventors, they have found the above objects of the present invention can be accomplished by dissolving or dispersing an acrylic resin, an amino resin, and an aluminum complex compound besides a fluorine-containing resin in water.

The present invention relates to, as a first aspect, a matte electrodepositable coating composition comprising a fluorine-containing resin, an acrylic resin, an amino resin, and an aluminum complex compound, which are dissolved or dispersed in water, the fluorine-containing resin and the acrylic resin both containing a carboxyl group and a hydroxyl group in molecules thereof, the differences in acid value and hydroxyl value between the fluorine-containing resin and the acrylic resin each being not more than 50, the average acid value of the fluorine-containing resin and the acrylic resin being not less than 35, the average hydroxyl value of the fluorine-containing resin and the acrylic resin being not less than 70, the proportion of the fluorine-containing resin and the acrylic resin being in the range of 20/80 to 80/20 by weight, and the aluminum complex compound being represented by formula (1) or (2):

$$Al(OR^1)(OR^2)(L) \qquad (1)$$

$$Al(L^1)(L^2)(L^3) \qquad (2)$$

wherein $R^1$ and $R^2$ each independently represents an alkyl group; and L, $L^1$, $L^2$, and $L^3$ each independently represent a keto-enol tautomeric compound.

The present invention also relates to, as a second aspect, a process for preparing a matte electrodepositable coating composition, the process comprising the steps of:

mixing a first mixture comprising a fluorine-containing resin and an acrylic resin dissolved in a water-miscible organic solvent with a second mixture comprising an aluminum complex compound represented by formula (1) or (2) above, and an amino resin, to prepare a third mixture; and mixing the third mixture with an aqueous medium to obtain a fourth mixture, wherein an alkaline substance is incorporated in at least one of the fluorine-containing resin, the acrylic resin, the amino resin, the aluminum complex compound, the first mixture, the second mixture, and the third mixture, to provide the fourth mixture with water solubility or

DETAILED DESCRIPTION OF THE INVENTION

The fluorine-containing resin used in the present invention contains a carboxyl group and a hydroxyl group in its molecule and exhibits water solubility or water dispersibility necessary for the preparation of a coating composition. The resin having water solubility or water dispersibility is preferably used in the form of a salt obtained by the neutralization thereof with an alkaline substance. Examples of the alkaline substance include aliphatic amines such as monoethylamine, diethylamine, and triethylamine; alkanolamines such as dimethylethanolamine, diethanolamine, and triethanolamine; cyclic amines such as pyridine and piperidine, and other organic bases. Among these, triethylamine and dimethylethanolamine are preferred.

The acid value of the fluorine-containing resin is preferably 15 to 50, and its hydroxyl value is preferably 15 to 100.

Specific examples of the fluorine-containing resin used in the present invention include a fluoroethylene-vinyl ether copolymer, a fluoroethylene-vinyl ether-vinyl ester copolymer, and a fluoroethylene-vinyl ether-allyl ether-vinyl ester copolymer.

The acrylic resin used in the present invention contains a carboxyl group and a hydroxyl group in its molecule and exhibits water solubility or water dispersibility necessary for the preparation of a coating composition. The resin having water solubility or water dispersibility is preferably used in the form of salt obtained by the neutralization thereof with an alkaline substance. Examples of the alkaline substance include those exemplified above for the fluorine-containing resin.

The acid value of the acrylic resin is preferably 30 to 100, and its hydroxyl value is preferably 40 to 180.

The introduction of a carboxyl group into the acrylic resin may be preferably accomplished by the polymerization of one or more vinyl-polymerizable α,β-unsaturated aliphatic acids such as acrylic acid, methacrylic acid, maleic acid, fumaric acid, a monoester of maleic acid, itaconic acid, a monoester of itaconic acid, crotonic acid, and citraconic acid. Further, acrylic acid and methacrylic acid can be advantageously used in combination to provide an even highly matte coating film.

The introduction of hydroxyl group into the acrylic resin may be preferably accomplished by the polymerization of one or more hydroxyl-containing monomers such as β-hydroxyethyl (meth)acrylate, β-hydroxypropyl (meth)acrylate, and allyl alcohol.

Further, one or more (meth)acrylates such as methyl (meth)acrylate, ethyl (meth)acrylate, isopropyl (meth)acrylate, isobutyl (meth)acrylate, n-butyl (meth)acrylate, 2-ethylhexyl (meth)acrylate, cyclohexyl (meth)acrylate, lauryl (meth)acrylate and (meth)acrylamides such as N-butoxy (meth)acrylamide and N-methylol (meth)acrylamide may be copolymerized as other acryl components. Besides the foregoing (meth)acrylates and (meth)acrylamides, styrene, α-methylstyrene, vinyl acetate, vinyl propionate, vinyl chloride, vinylidene chloride, (meth)acrylonitrile, etc. may be copolymerized.

The term "(meth)acryl" and the like used herein means "acryl and methacryl" and the like.

The preparation of the acrylic resin can be accomplished by any known polymerization method such as solution polymerization, emulsion polymerization and suspension polymerization. Preferred among these polymerization methods is solution polymerization using various solvents such as alcohol solvent (e.g., methanol, ethanol, isopropanol, ethylene glycol, trimethylol propane, glycerin), cellosolve solvent (e.g., methyl cellosolve, ethyl cellosolve, n-butyl cellosolve) and water-miscible solvent (e.g., propylene glycols, carbitols, glymes, cellosolve acetates). The acrylic resin prepared by an aqueous polymerization method such as emulsion polymerization and suspension polymerization should be dehydrated, and then dissolved in the foregoing solvents to obtain a substantially anhydrous solution.

Examples of a polymerization catalyst used for the preparation of the acrylic resin include an azo compound, a peroxide compound, a sulfide compound, a sulfin compound, a diazo compound, a nitroso compound or the like. These catalysts may be used in a commonly used amount.

The amount of the alkaline substance to be added to the fluorine-containing resin and the acrylic resin to provide them with water solubility or water dispersibility is generally in the range of 0.2 to 1.0 equivalent, preferably in the range of 0.3 to 0.9 equivalent, based on the total amount of carboxyl groups in the fluorine-containing resin and the acrylic resin.

In the coating composition of the present invention, the fluorine-containing resin and the acrylic resin are used in a weight ratio of 20/80 to 80/20, preferably 40/60 to 80/20.

If the amount ratio of the fluorine-containing resin is smaller than the above range, the resulting composition exhibits a reduced weather resistance. If the amount ratio of the acrylic resin is smaller than the above range, the resulting composition exhibits a reduced throwing power, making it impossible to provide a uniform coating on a material to be coated.

The difference in acid value between the fluorine-containing resin and the acrylic resin is not more than 50, preferably not more than 45. The difference in hydroxyl value between the fluorine-containing resin and acrylic resin is not more than 50, preferably not more than 40.

If the difference of the acid value or the difference of the hydroxyl value between the fluorine-containing resin and the acrylic resin each exceed 50, the compatibility between the fluorine-containing resin and the acrylic resin is poor, reducing the transparency of the coating film and impairing the stability of the coating composition.

The average acid value of the fluorine-containing resin and the acrylic resin is not less than 35, preferably not less than 40. The average hydroxyl value of the fluorine-containing resin and the acrylic resin is not less than 70, preferably not less than 75. The average acid value and the average hydroxyl value are represented by the following equations:

$$\text{Average acid value (mgKOH/mg)} = \frac{Af \times Wf + Aa \times Wa}{Wf + Wa}$$

$$\text{Average hydroxyl value (mgKOH/mg)} = \frac{Hf \times Wf + Ha \times Wa}{Wf + Wa}$$

Af: acid value of fluorine-containing resin
Aa: acid value of acrylic resin
Hf: hydroxyl value of fluorine-containing resin
Ha: hydroxyl value of acrylic resin Wf: weight ratio of fluorine-containing resin
Wa: weight ratio of acrylic resin If the average acid value is less than 35 or the average hydroxyl value is less than 70, the resulting coating composition exhibits a reduced throwing power, making it impossible to provide a uniform coating on the material to be coated, or the reaction with the amino resin described later is insufficient, causing the coating film to be insufficiently cured. If the average acid value and average hydroxyl value are too great, the weather resistance, alkali resistance and acid resistance of the coating film tend to be reduced. Therefore, the average acid value is preferably not more than 150, particularly not more than 100. The average hydroxyl value is preferably not more than 250, particularly not more than 200.

The weight-average molecular weight of the fluorine-containing resin and the acrylic resin are each preferably in the range of 5,000 to 100,000. If the weight-average molecular weight falls below 5,000, the resulting coating film tends to exhibit deterioration in all properties, particularly weather resistance. If the weight-average molecular weight exceeds 100,000, the coating composition tends to be too viscous to be handled, and the electrodeposited coating film may exhibit a reduced fluidity upon heat curing, possibly giving a coating film with a reduced smoothness.

Examples of the amino resin used in the present invention include a melamine resin, a benzoguanamine resin, a urea resin or the like, preferably a melamine resin, more preferably an alkyl etherified melamine resin, such as an alkoxymethylmelamine resin containing a methoxy group, an ethoxy group, an n-butoxy group, an isobutoxy group or the like as an alkoxy group. Such a resin may generally be obtained by allowing melamine to undergoing addition reaction or addition condensation reaction with an aldehyde such as formaldehyde and paraformaldehyde, and then etherifying the resulting addition product or addition condensation product with a monovalent alcohol having 1 to 4 carbon atoms. In the present invention, a methyl/butyl mixed ether melamine is particularly preferred from the standpoint of water solubility and electrodepositability.

Examples of commercially available mixed ether melamines include Cymel 285, 266, 232, 235, 238, 236 (available from Mitsui Cyanamid Ltd.), and Nikalac MX-40, and Nikalac MX-45 (available from Sanwa Chemical Co., Ltd.).

The above commercially available mixed ether melamines have the following basic chemical structure:

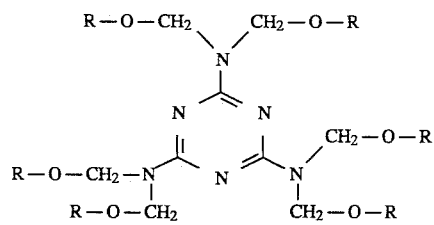

(where R represents a methyl group or a butyl group), and various condensed products such as a monomer, a dimer, a trimer, or higher condensed products, and derivatives, in which the alkyl group is a methyl group or a butyl group in case of Cymel, are also commercially available under the same trade name with different grades.

The weight ratio of the mixture of the fluorine-containing resin and the acrylic resin to the amino resin is generally in the range of 70/30 to 50/50. It may be properly adjusted depending on the content of a carboxyl group and a hydroxyl group in the fluorine-containing resin and the acrylic resin, the desired properties of the coating, etc.

In the coating composition of the present invention, the ratios of fluorine-containing resin, acrylic resin and amino resin can be adjusted in a wide range. The contents of a carboxyl group and a hydroxyl group in the fluorine-containing resin and the acrylic resin are more important than the amount ratio of the various resin components.

In the present invention, the aluminum complex compound to be mixed with the amino resin can drastically enhance the matte effect on the electrodeposited coating film. The complex compound is represented by formula (1) or (2). In formulae (1) and (2), $R^1$ and $R^2$ each independently represent an alkyl group, preferably a straight-chain or branched alkyl group having 2 to 24 carbon atoms, more preferably an isopropyl group, a 2-ethylhexyl group, a lauryl group, and an oleyl group. In a particularly preferred embodiment, $R^1$ represents an isopropyl group, and $R^2$ represents an oleyl group. L, $L^1$, $L^2$, and $L^3$ each independently represent a keto-enol tautomeric compound such as an acetylacetone and an ethyl acetoacetate, preferably an alkylacetylacetone such as ethylacetylacetone. Commercially available examples of the aluminum complex compound include OL-1000, Aluminum Chelate D (available from Kawaken Fine Chemicals Co., Ltd.), and Plenact ALM (available from Ajinomoto Co., Ltd.).

The amount of the aluminum complex compound is generally in the range of 0.1 to 10 parts by weight, preferably 0.5 to 5 parts by weight, per 100 parts by weight of the total amount of the fluorine-containing resin and the acrylic resin in the first mixture and the amino resin in the second mixture. The higher the molecular weight, the acid value, the hydroxyl value, and the glass transition point of the fluorine-containing resin and the acrylic resin are, the higher is the matte effect obtained by the addition of a small amount of the complex compound. The glass transition points of the fluorine-containing resin and the acrylic resin are generally $-70°$ to $150°$ C., preferably $20°$ to $90°$ C.

The second aspect of the present invention provides a process for preparing a matte electrodepositable coating composition. The process comprises mixing a first mixture comprising the fluorine-containing resin and the acrylic resin dissolved in a water-miscible organic solvent with a second mixture comprising the aluminum complex compound represented by formula (1) or (2) and the amino resin to prepare a third mixture, and then mixing the third mixture with an aqueous medium to obtain a fourth mixture. In the process of the present invention, an alkaline substance is incorporated in at least one of the above components and/or at least one of the above mixtures to provide the fourth mixture with water solubility or water dispersibility.

Examples of the water-miscible organic solvent include alcohol solvents such as methanol, ethanol, isopropanol (IPA), n-butanol, ethylene glycol, propylene glycol, trimethylolpropane, and glycerin; cellosolve solvents such as methylcellosolve, ethylcellosolve and n-butylcellosolve; and other water-miscible organic solvents such as carbitol solvents, glyme solvents, and cellosolve acetate solvents.

In the process of the present invention, the provision of water solubility or water dispersibility can be accomplished by using the alkaline substance. It can be accomplished by neutralizing the carboxyl group in the fluorine-containing resin and the acrylic resin with the alkaline substance such as aliphatic amines such as monoethylamine, diethylamine, and triethylamine; alkanolamines such as dimethyl ethanolamine, diethanolamine, and triethanolamine; cyclic amines such as pyridine and piperidine, and other organic bases, preferably triethylamine and dimethylethanolamine, in an amount of generally 0.2 to 1.0 equivalents, preferably 0.3 to 0.9 equivalent, based on the amount of the carboxyl group.

The alkaline substance may be incorporated in any components and/or any mixtures constituting the coating composition, preferably in the first mixture comprising the fluorine-containing resin and the acrylic resin. If the alkaline substance is incorporated in other components or mixtures, the neutralization reaction of the alkaline substance with the carboxyl group in the fluorine-containing resin and the acrylic resin tends not to proceed thoroughly, possibly causing the production of agglomerates.

The aqueous medium may be water or a mixture of water and a water-miscible organic solvent, optionally mixed with an organic solvent having a poor water miscibility.

The reason why the first mixture and the second mixture are firstly prepared and then they are mixed to prepare the third mixture is that the aluminum complex compound has a high reactivity with a carboxyl group and a hydroxyl group and thus can cause partial gelation if it is directly added to the fluorine-containing resin or the acrylic resin. By thoroughly mixing the complex compound and the amino resin previously as in the preparation process of the present invention, inhibition of the contact of the fluorine-containing resin and the acrylic resin with the complex compound, or like reasons causes gelation to proceed extremely slowly, making it possible to obtain a stable coating composition. The process according to the second aspect of the present invention is particularly suitable for the preparation of a coating composition according to the first aspect of the present invention.

The fourth mixture, which is water-soluble or water-dispersible, prepared by the second aspect of the present invention may be put into practical use as a matte electrodepositable coating as it is or in the form of mixture with desired additives or in the diluted form. The concentration of solid content (i.e., the total content of the fluorine-containing resin, the acrylic resin, an amino resin, and the aluminum complex compound) in the coating composition in the electrodepositable coating bath is generally in the range of 3 to 20% by weight, preferably 5 to 15% by weight. If it less than 3% by weight, the coating must be effected at a higher voltage. If it exceeds 20% by weight, the loss of the coating composition outside the coating system is increased to economic disadvantage. The electrodeposition can generally be effected at a coating bath temperature of 15° to 35° C. and a voltage of 80 to 350 V for 1 to 5 minutes.

The electrodeposition-coated material is then generally heated to a temperature of 150° to 220° C. for 10 to 60 minutes, optionally after rinsing, to cure the coating film. The dry thickness of the coating film thus formed is preferably in the range of 5 to 30 μm.

The material to which the coating composition of the present invention can be applied is not specifically limited, and may be any electrically conductive material. The coating composition of the present invention is particularly suitable for the coating of aluminum products such as aluminum sash window frame.

In general, a fluorine-containing resin has a low acid value and hydroxyl value. An electrodepositable coating comprising such a fluorine-containing resin exhibits a poor throwing power, failing to provide a uniform coating on the material to be coated. It has been known that a matte coating film can be provided by using a mixture of two or more resins having a poor compatibility as a base resin. However, such a coating film disadvantageously exhibits a poor transparency.

In the matte electrodepositable coating composition of the present invention, the difference in acid value and hydroxyl value between the fluorine-containing resin and the acrylic resin can be predetermined to not more than a specified value to form a coating film having a high transparency. This is possibly because this arrangement improves the compatibility of the fluorine-containing resin with the acrylic resin to prevent phase separation.

Further, the average acid value and average hydroxyl value of the fluorine-containing resin and the acrylic resin can be each predetermined to not less than the specified values, respectively, to obtain a composition having a high throwing power. This is possibly because that the fluorine-containing resin is connected to the acrylic resin of a high acid value and hydroxyl value, thus having a high throwing power via the aluminum complex compound, to improve the throwing power of the entire coating composition.

The present invention will be described in more detail with reference to the following Examples and Comparative Examples, but the present invention should not be construed as being limited thereto.

(1) Preparation of Fluorine-containing Resin

Into a stainless steel autoclave equipped with a stirrer (internal volume: 500 ml; maximum allowable pressure: 50 kg/cm$^2$) were charged 70 parts by weight of chlorotrifluoroethylene, 22 parts by weight of cyclohexyl vinyl ether, 8.6 parts by weight of ethyl vinyl ether, 26 parts by weight of hydroxyethyl vinyl ether, 196 parts by weight of xylene, 56 parts by weight of ethanol, 1.0 part by weight of azobisisobutylonitrile, and 3.0 parts by weight of potassium carbonate anhydride. The mixture was then cooled with liquid nitrogen so that it was solidified and deaerated to remove dissolved air therefrom. The mixture was stirred at a temperature of 65° C. for 16 hours so that the reaction proceeded to obtain a fluorine-containing resin.

An about 60 wt% xylene solution of the fluorine-containing resin thus obtained was prepared. The solution was then heated to a temperature of 90° C. To the solution was then added succinic anhydride in an amount of 5.4 parts by weight per 100 parts by weight of the resin. To the mixture were then added 0.2 parts by weight of triethylamine. The mixture was allowed to undergo reaction for 2 hours to obtain a fluorine-containing resin (F1) containing carboxyl groups and hydroxyl groups in its molecule. A fluorine-containing resin (F2) was prepared in the same manner as above except that hydroxybutyl vinyl ether and succinic anhydride were properly used.

Table 1 shows the acid value, the hydroxyl value, and the weight-average molecular weight of the fluorine-containing resins F1 and F2.

TABLE 1

|  | Fluorine-containing resins | |
| --- | --- | --- |
|  | F1 | F2 |
| Acid value (KOHmg/mg) | 29 | 12 |
| Hydroxyl value (KOHmg/mg) | 71 | 36 |
| Weight average molecular weight | 32,000 | 26,000 |

(2) Preparation of Acrylic Resin 8 kinds of acrylic resins were prepared by mixing various monomers set forth in Table 2 with IPA as a solvent, and then copolymerizing the mixture. The polymers thus obtained were then measured for acid value, hydroxyl value and weight-average molecular weight. The results are set forth in Table 2.

In the preparation processes (1) and (2), the acid value, the hydroxyl value, and the weight-average molecular weight were determined by the following methods:

(i) The acid value was measured in accordance with JIS K0070.
(ii) The hydroxyl value was measured in accordance with JIS K0070.
(iii) The weight-average molecular weight was determined by GPC with a calibration curve of standard polystyrenes.

to obtain a mixture 1.

40 parts by weight of an amino resin (Cymel 235), 3.2 parts by weight of an aluminum complex compound (Plenact ALM), and 22.5 parts by weight of IPA were mixed. The mixture was stirred at room temperature for 30 minutes to obtain a mixture 2. The mixture 2 was then added to the mixture 1. The mixture was then stirred at room temperature for 30 minutes.

To the mixture thus obtained was then added water with stirring to prepare a coating composition.

TABLE 2

|  | Acrylic resins | | | | | | | |
|---|---|---|---|---|---|---|---|---|
|  | A1 | A2 | A3 | A4 | A5 | A6 | A7 | A8 |
| Isopropyl alcohol (solvent) | 53.8 | 53.8 | 53.8 | 53.8 | 53.8 | 53.8 | 53.8 | 53.8 |
| Monomers | | | | | | | | |
| Isobutyl acrylate | 20 | 27 | 45 | 35 | 22 | 22 | 22 | 19 |
| Methyl methacrylate | 27 | 35 | 32 | 35 | 35 | 35 | 28 | 35 |
| Styrene | 10 | 10 | 10 | 10 | 10 | 10 | 10 | 10 |
| Acrylic acid | 6 | 5 | 6 | 7 | 10 | 6 | 6 | 13 |
| Methacrylic acid | 4 | 0 | 4 | 0 | 0 | 4 | 4 | 0 |
| Hydroxyethyl acrylate | 30 | 18 | 0 | 18 | 18 | 18 | 25 | 18 |
| N-Butoxyacrylamide | 3 | 5 | 3 | 5 | 5 | 5 | 5 | 5 |
| Acid value (KOHmg/mg) | 72 | 39 | 72 | 55 | 78 | 72 | 72 | 101 |
| Hydroxyl value (KOHmg/mg) | 145 | 87 | 0 | 87 | 87 | 87 | 120 | 87 |
| Weight average molecular weight | 22,000 | 55,000 | 24,000 | 84,000 | 98,000 | 39,000 | 40,500 | 80,000 |

EXAMPLE 1

A coating composition was prepared by using the fluorine-containing resin and the acrylic resin prepared above.

50 parts by weight of the fluorine-containing resin solution having a solid resin content of 30 parts by weight and a solid content concentration of 60% by weight by diluting with IPA, 46.2 parts by weight of the acrylic resin solution having a solid resin content of 30 parts by weight and a solid content concentration of 65% by weight by diluting with IPA, 15 parts by weight of IPA, and triethylamine in such an amount that the acid component in the fluorine-containing resin and the acrylic resin is neutralized by 70% were mixed. The mixture was stirred at room temperature for 30 minutes

EXAMPLES 2 TO 11

The coating compositions were prepared in the same manner as in Example 1 except that the amount of the fluorine-containing resins, the kind and amount of the acrylic resins, the kind and amount of the amino resins, and the kind of the aluminum complex compounds were changed as shown in Table 3, to have the differences in acid value and hydroxyl value between the fluorine-containing resin and the acrylic resin, and the average acid value and hydroxyl value of the fluorine-containing resin and the acrylic resin shown in Table 3.

TABLE 3

| Example | Fluorine-containing resin Kind | Amount | Acrylic resin Kind | Amount | Amino resin Kind | Amount | Complex compound Kind | Amount | Acid value difference | Hydroxyl value difference | Average acid value | Average hydroxyl value |
|---|---|---|---|---|---|---|---|---|---|---|---|---|
| 1 | F1 | 30 | A4 | 30 | Cymel 235 | 40 | Plenact ALM | 3.2 | 26 | 16 | 42 | 79 |
| 2 | F1 | 30 | A5 | 30 | Cymel 235 | 40 | Plenact ALM | 3.2 | 49 | 16 | 54 | 79 |
| 3 | F1 | 30 | A7 | 30 | Cymel 235 | 40 | Plenact ALM | 3.2 | 43 | 49 | 51 | 96 |
| 4 | F1 | 30 | A6 | 30 | Cymel 235 | 40 | Plenact ALM | 3.2 | 43 | 16 | 51 | 79 |
| 5 | F1 | 30 | A6 | 30 | Cymel 232 | 40 | Plenact ALM | 3.2 | 43 | 16 | 51 | 79 |
| 6 | F1 | 27.5 | A6 | 27.5 | Cymel 235 | 45 | Plenact ALM | 3.2 | 43 | 16 | 51 | 79 |
| 7 | F1 | 35 | A6 | 35 | Cymel 235 | 30 | Plenact ALM | 3.2 | 43 | 16 | 51 | 79 |
| 8 | F1 | 30 | A6 | 30 | Cymel 232 | 40 | Alumichelate D | 3.2 | 43 | 16 | 51 | 79 |
| 9 | F1 | 30 | A6 | 30 | Cymel | 40 | OL-1000 | 3.2 | 43 | 16 | 51 | 79 |

TABLE 3-continued

| Exam-ple | Fluorine-containing resin | | Acrylic resin | | Amino resin | | Complex compound | | Acid value difference | Hydroxyl value difference | Average acid value | Average hydroxyl value |
|---|---|---|---|---|---|---|---|---|---|---|---|---|
| | Kind | Amount | Kind | Amount | Kind | Amount | Kind | Amount | | | | |
| 10 | F1 | 45 | A6 | 15 | Cymel 232 | 40 | Plenact ALM | 3.2 | 43 | 16 | 40 | 75 |
| 11 | F1 | 15 | A6 | 45 | Cymel 232 | 40 | Plenact ALM | 3.2 | 43 | 16 | 62 | 83 |

Electrodeposition coating was carried out by using the coating compositions obtained above.

The coating compositions were each charged into an electrodeposition bath having a length of 10 cm, a width of 9 cm, and a depth of 13 cm. An anodized aluminum plate (A6063S) with an anodized film thickness of 12 μm having a length of 15 cm and a width of 7 cm as a material to be coated was immersed in the coating composition 1 cm apart from the wall and the bottom of the bath. With the aluminum plate as an anode, an electric current was passed through the coating composition for 2 minutes to form a coating film thereon. The aluminum plate was withdrawn from the electrodeposition bath, washed with water, and then heated to a temperature of 180° C. for 30 minutes to cure the coating film.

The thickness, transparency, gloss, hardness, throwing power, and weather resistance (determined by sunshine weatherometer) of the coating film thus obtained are set forth in Table 4.

The evaluation methods and evaluation standards of the properties of the coating film are as follows:

(i) The film thickness was measured by an eddy current thickness gauge in accordance with JIS H8602-4.6

(ii) The transparency was visually observed and evaluated in accordance with the following standards:
A: transparent
B: opaque and smoked appearance (iii) The specular gloss at 60° was measured in accordance with JIS Z8741. When a gloss of not more than 30 was obtained, it was judged that a matte coating film had been formed.

(iv) The hardness was measured in accordance with JIS H8602-4.8. The hardness of the coating film is represented by the lowest hardness of the pencil with which it can be scratched.

(v) The throwing power was evaluated by the difference in film thickness between both the surfaces of the coated material in accordance with the following standards based on the magnitude of the difference in film thickness:
A: film thickness difference of less than 2 μm
B: film thickness difference of not less than 2 μm (vi) The weathering resistance was measured in accordance with JIS H8602-4.11. After 4,000 hours of irradiation with a sunshine weatherometer, the coating film was visually evaluated for abnormality in external appearance such as blister, surface roughness and discoloration. The external appearance was evaluated in the following standards:
A: no abnormality
B: abnormality The gloss retention was also evaluated, which was represented by the percentage of the gloss after irradiation relative to the initial value as 100.

TABLE 4

| Example | Voltage (V) | Film thickness (μm) | Transparency | Gloss | Hardness | Throwing power | Weather resistance | |
|---|---|---|---|---|---|---|---|---|
| | | | | | | | External apperance | Gloss retention (%) |
| 1 | 130 | 10 | A | 19 | 4H | A | A | 108 |
| 2 | 130 | 10 | A | 10 | 4H | A | A | 134 |
| 3 | 120 | 10 | A | 20 | 4H | A | A | 120 |
| 4 | 110 | 10 | A | 17 | 4H | A | A | 105 |
| 5 | 110 | 10 | A | 16 | 4H | A | A | 102 |
| 6 | 110 | 10 | A | 15 | 4H | A | A | 99 |
| 7 | 110 | 10 | A | 15 | 4H | A | A | 103 |
| 8 | 110 | 10 | A | 24 | 4H | A | A | 112 |
| 9 | 110 | 10 | A | 21 | 4H | A | A | 98 |
| 10 | 100 | 10 | A | 16 | 4H | A | A | 108 |
| 11 | 110 | 10 | A | 16 | 4H | A | A | 101 |

Table 4 shows that all the coating films exhibit a good transparency, a hardness as high as 4H, and a gloss as low as 24 at maximum, showing a sufficient matte effect. Further, the differences in film thickness between both the surfaces of the coated materials were all less than 2 μm, showing a good throwing power. After 4,000 hours of weathering acceleration test by sunshine weatherometer, none of these coated materials showed abnormalities in external appearance. These coated materials showed a gloss retention 98% at minimum, proving that the initial matte effect had not been impaired. It was thus found that coating films having a good weather resistance had been formed.

COMPARATIVE EXAMPLES 1 TO 8

Comparative coating compositions were prepared in the same manner as in Example 1 except that the kind and amount of the fluorine-containing resins, the acrylic resins, the amino resins, and the aluminum complex compounds used were changed as shown in Table 5. Table 5 also shows the difference in acid value, the difference in hydroxyl value, the average acid value, and the average hydroxyl value of the fluorine-containing resins and the acrylic resins.

The asterisked (*) parameters in Table 5 are outside the scope of the present invention.

The coating compositions of Comparative Examples 1 to 11 were subjected to electrodeposition coating and evaluated in the same manner as in Examples 1 to 11. The results of evaluation are set forth in Table 6.

and a smoked finish.

In Comparative Example 2, the difference in hydroxyl value far exceeds the upper limit. In Comparative Example 3, the difference in acid value far exceeds the upper limit. It was thus found that Comparative Examples 2 and 3 provided coating film with an even heavier smoked finish than Comparative Example 1.

In Comparative Example 4, the difference in acid value, the difference in hydroxyl value, the average acid value, and the average hydroxyl value were within the scope of the present invention, but no aluminum complex compound was were used. It was thus found that the coating film of Comparative Example 4 had a high gloss and thus exhibited no matte effect.

In Comparative Example 5, the average hydroxyl value was as low as 35. Accordingly, Comparative Example 5

TABLE 5

| Comparative Example | Fluorine-containing resin | | Acrylic resin | | Amino resin | | Complex compound | | Acid value difference | Hydroxyl value difference | Average acid value | Average hydroxyl value |
| --- | --- | --- | --- | --- | --- | --- | --- | --- | --- | --- | --- | --- |
| | Kind | Amount | Kind | Amount | Kind | Amount | Kind | Amount | | | | |
| 1 | F2 | 30 | A2 | 30 | Cymel 235 | 40 | Plenact ALM | 3.2 | 27 | 51* | 26* | 62* |
| 2 | F2 | 30 | A1 | 30 | Cymel 235 | 40 | Plenact ALM | 3.2 | 60* | 109* | 42 | 91 |
| 3 | F1 | 30 | A8 | 30 | Cymel 235 | 40 | Plenact ALM | 3.2 | 72* | 16 | 65 | 79 |
| 4 | F1 | 30 | A6 | 30 | Cymel 232 | 40 | none* | — | 43 | 16 | 51 | 79 |
| 5 | F1 | 30 | A3 | 30 | Cymel 235 | 40 | Plenact ALM | 3.2 | 43 | 71* | 51 | 35* |
| 6 | F1 | 54 | A6 | 6* | Cymel 232 | 40 | Plenact ALM | 3.2 | 43 | 16 | 33* | 73 |
| 7 | F1 | 6* | A6 | 54 | Cymel 232 | 40 | Plenact ALM | 3.2 | 43 | 16 | 68 | 85 |
| 8 | F1 | 60 | none* | — | Cymel 232 | 40 | Plenact ALM | 3.2 | — | — | — | — |

TABLE 6

| Comparative example | Voltage (V) | Film thickness (μm) | Transparency | Gloss | Hardness | Throwing power | Weather resistance External appearance | Weather resistance Gloss retention (%) |
| --- | --- | --- | --- | --- | --- | --- | --- | --- |
| 1 | 120 | 10 | B | 57 | 4H | B | A | 105 |
| 2 | 120 | 10 | B | 25 | 4H | A | A | 105 |
| 3 | 110 | 10 | B | 18 | 4H | A | A | 104 |
| 4 | 100 | 10 | A | 80 | 4H | A | A | 121 |
| 5 | 110 | 10 | B | 60 | H | B | B (blister) | not measured |
| 6 | 100 | 10 | A (rough surface) | 75 | 3H | B | A | 108 |
| 7 | 110 | 10 | A | 25 | 4H | A | A | 55 |
| 8 | 100 | 10 | A (rough surface) | 77 | 2H | B | not measured | not measured |

Comparative Example 1 with the coating composition comprising the fluorine-containing resin and the acrylic resin, the average acid value and the average hydroxyl value of which were each less than 35 and less than 70, respectively, exhibited a poor throwing power and could not give a matte coating film. Further, the hydroxyl value difference between the fluorine-containing resin and the acrylic resin was more than 50, the coating film was of a low transparency showed a poor throwing power, and the resulting coating film lacked crosslinking and thus exhibited the lowest pencil hardness with which it could be scratched. Some blister occurred in the coating film in the weathering test. Further, since the difference in hydroxyl value is high, the coating film exhibited a low transparency. Moreover, because of the low average hydroxyl value, the throwing power was poor.

In Comparative Example 6, the proportion of the fluorine-containing resin was too high, and that of acrylic resin was too low. Accordingly, Comparative Example 6 showed roughened surface on the coating film. Further, since the average acid value was slightly smaller than the lower limit, the throwing power was slightly poor.

In Comparative Example 7, the proportion of the fluorine-containing resin was smaller than the lower limit. Accordingly, the coating film obtained in Comparative Example 7 showed a low gloss retention in the weathering test.

In Comparative Example 8, no acrylic resin was used. Accordingly, the coating film obtained in Comparative Example 8 exhibited too high a gloss to give a matte effect. Further, since the acid value of the fluorine-containing resin used was low, the throwing power was poor.

As mentioned above, the matte electrodepositable coating composition of the present invention can provide a matte electrodeposition coating film having a good transparency, a high hardness, a good weather resistance and a minimized gloss. Further, the matte electrodepositable coating composition of the present invention exhibits a high throwing power and thus can be uniformly applied to the material to be coated.

In accordance with the preparation process of the present invention, the useful coating composition of the present invention can be easily prepared without any special apparatus or any specific reaction conditions.

While the invention has been described in detail and with reference to specific embodiments thereof, it will be apparent to one skilled in the art that various changes and modifications can be made therein without departing from the spirit and scope thereof.

What is claimed is:

1. A matte electrodepositable coating composition comprising a fluorine-containing resin, an acrylic resin, an amino resin, and an aluminum complex compound, which are dissolved or dispersed in water, said fluorine-containing resin and said acrylic resin both containing a carboxyl group and a hydroxyl group in molecules thereof, the differences in acid value and hydroxyl value between said fluorine-containing resin and said acrylic resin each being not more than 50, the average acid value of said fluorine-containing resin and said acrylic resin being not less than 35, the average hydroxyl value of said fluorine-containing resin and said acrylic resin being not less than 70, the proportion of said fluorine-containing resin and said acrylic resin being in the range of 20/80 to 80/20 by weight, and said aluminum complex compound being represented by formula (1) or (2):

$$Al(OR^1)(OR^2)(L) \qquad (1)$$

$$Al(L^1)(L^2)(L^3) \qquad (2)$$

wherein $R^1$ and $R^2$ each independently represents an alkyl group; and L, $L^1$, $L^2$, and $L^3$ each independently represent a keto-enol tautomeric compound.

2. A matte electrodepositable coating composition as claimed in claim 1, wherein said fluorine-containing resin and said acrylic resin each has a weight average molecular weight of from 5,000 to 100,000.

3. A matte electrodepositable coating composition as claimed in claim 1, wherein said amino resin is an alkyl etherified melamine resin.

4. A matte electrodepositable coating composition as claimed in claim 1, wherein the proportion of the total amount of said fluorine-containing resin and said acrylic resin to the amount of said amino resin is from 70/30 to 50/50 by weight.

5. A matte electrodepositable coating composition as claimed in claim 1, wherein the amount of said aluminum complex compound is from 0.1 to 10 parts by weight per 100 parts by weight in total of said fluorine-containing resin, said acrylic resin, and said amino resin.

6. A process for preparing a matte electrodepositable coating composition, said process comprising the steps of:

mixing a first mixture comprising a fluorine-containing resin and an acrylic resin dissolved in a water-miscible organic solvent with a second mixture comprising an aluminum complex compound represented by formula (1) or (2):

$$Al(OR^1)(OR^2)(L) \qquad (1)$$

$$Al(L^1)(L^2)(L^3) \qquad (2)$$

wherein $R^1$ and $R^2$ each independently represents an alkyl group; and L, $L^1$, $L^2$, and $L^3$ each independently represent a keto-enol tautomeric compound, and an amino resin to prepare a third mixture; and mixing said third mixture with an aqueous medium to obtain a fourth mixture, wherein an alkaline substance is incorporated in at least one of said fluorine-containing resin, said acrylic resin, said amino resin, said aluminum complex compound, said first mixture, said second mixture, and said third mixture, to provide said fourth mixture with water solubility or water dispersibility.

7. A process for preparing a matte electrodepositable coating composition as claimed in claim 6, wherein said fluorine-containing resin and said acrylic resin each has a weight average molecular weight of from 5,000 to 100,000.

8. A process for preparing a matte electrodepositable coating composition as claimed in claim 6, wherein said amino resin is an alkyl etherified melamine resin.

9. A process for preparing a matte electrodepositable coating composition as claimed in claim 6, wherein the proportion of the total amount of said fluorine-containing resin and said acrylic resin to the amount of said amino resin is from 70/30 to 50/50 by weight.

10. A process for preparing a matte electrodepositable coating composition as claimed in claim 6, wherein the amount of said aluminum complex compound is from 0.1 to 10 parts by weight per 100 parts by weight in total of said fluorine-containing resin, said acrylic resin, and said amino resin.

11. A process for preparing a matte electrodepositable coating composition as claimed in claim 6, wherein said fourth mixture contains said alkaline substance in an amount of from 0.2 to 1.0 equivalent to said carboxyl group contained in said fluorine-containing resin and said acrylic resin.

* * * * *